US012687722B2

(12) United States Patent
   Ozawa

(10) Patent No.: US 12,687,722 B2
(45) Date of Patent: Jul. 21, 2026

(54) EYEWEAR DISPLAY DEVICE AND NON-TRANSITORY RECORDING MEDIUM

(71) Applicant: Konica Minolta, Inc., Tokyo (JP)

(72) Inventor: Tomohiro Ozawa, Tachikawa (JP)

(73) Assignee: Konica Minolta, Inc., Tokyo (JP)

( * ) Notice: Subject to any disclaimer, the term of this patent is extended or adjusted under 35 U.S.C. 154(b) by 272 days.

(21) Appl. No.: 18/462,374

(22) Filed: Sep. 6, 2023

(65) Prior Publication Data

US 2024/0077732 A1      Mar. 7, 2024

(30) Foreign Application Priority Data

Sep. 7, 2022    (JP) ................................. 2022-142311

(51) Int. Cl.
   *G02B 27/01*        (2006.01)
   *G02B 27/00*        (2006.01)
(52) U.S. Cl.
   CPC ..... *G02B 27/0172* (2013.01); *G02B 27/0093* (2013.01); *G02B 2027/014* (2013.01); *G02B 2027/0178* (2013.01); *G02B 2027/0187* (2013.01)
(58) Field of Classification Search
   CPC ................................................ G02B 27/0172
   See application file for complete search history.

(56) References Cited

U.S. PATENT DOCUMENTS

2023/0244077 A1* 8/2023 Kollin ................ G02B 27/0081
                                                         359/630

FOREIGN PATENT DOCUMENTS

| JP | 2008-065169 A | 3/2008 |
|---|---|---|
| JP | 2014218199 A | 11/2014 |
| JP | 2018-132937 A | 8/2018 |
| JP | 2019046248 A | 3/2019 |
| WO | 2017104198 A1 | 6/2017 |
| WO | 2022123750 A1 | 6/2022 |

OTHER PUBLICATIONS

Notification of Reasons for Refusal issued in corresponding Japanese Patent Application No. 2022-142311, mailed Dec. 16, 2025, with translation (11 pages).
Office Action issued in counterpart Japanese Patent Application No. 2022-142311 mailed Mar. 10, 2026 (8 pages).

* cited by examiner

*Primary Examiner* — Edmond C Lau
(74) *Attorney, Agent, or Firm* — Osha Bergman Watanabe & Burton LLP

(57)        ABSTRACT

An eyewear display device includes: a display that displays one or more display areas in front of eyes of a user wearing the eyewear display device; a line-of-sight recognizer that recognizes a line of sight of the user; and a hardware processor that identifies one of the display areas to which the user is turning the eyes, based on a movement of the line of sight recognized by the line-of-sight recognizer, and changes a position of the identified display area.

15 Claims, 6 Drawing Sheets

FIG. 2

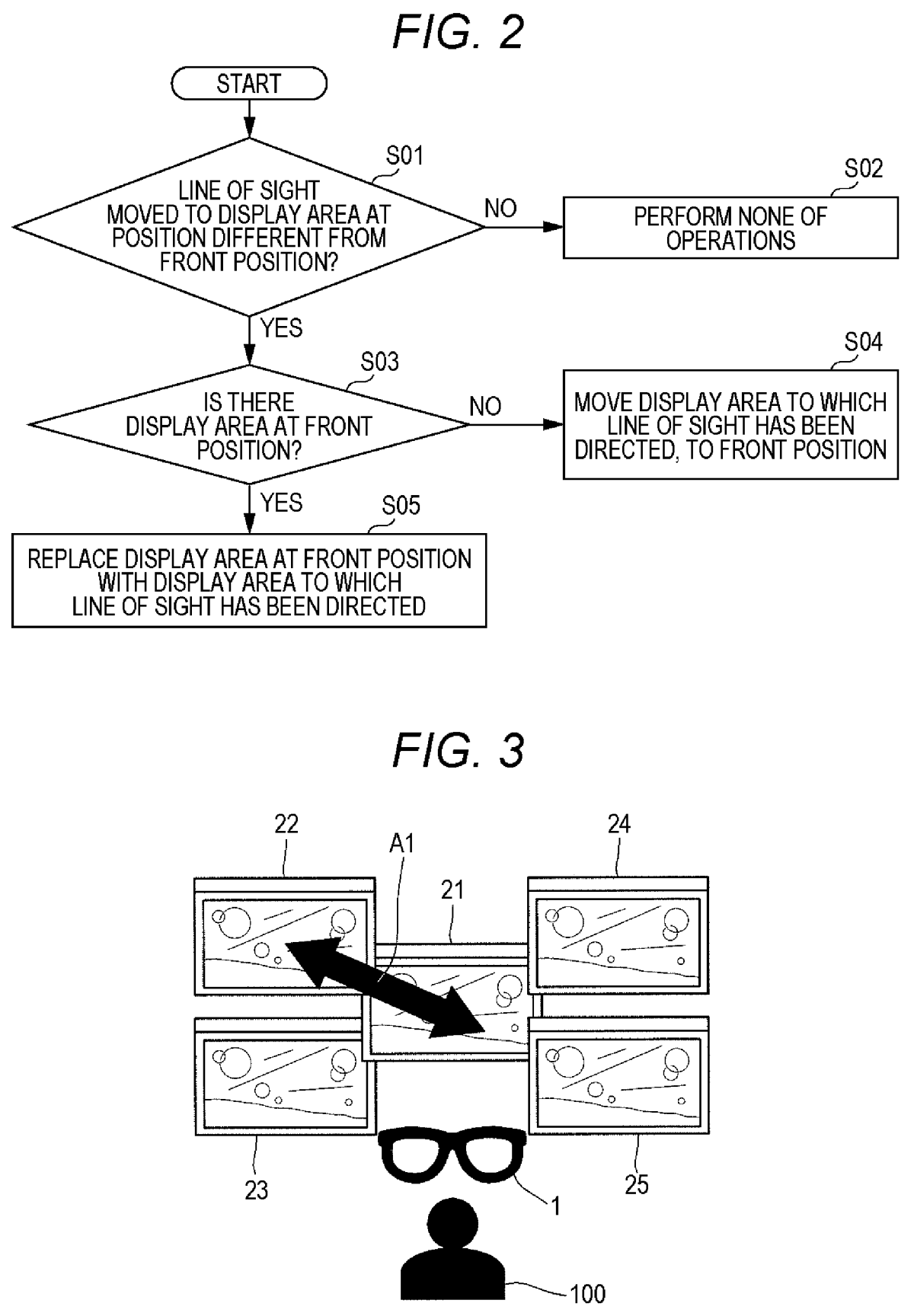

START

S01
LINE OF SIGHT MOVED TO DISPLAY AREA AT POSITION DIFFERENT FROM FRONT POSITION?

NO →

S02
PERFORM NONE OF OPERATIONS

↓ YES

S03
IS THERE DISPLAY AREA AT FRONT POSITION?

NO →

S04
MOVE DISPLAY AREA TO WHICH LINE OF SIGHT HAS BEEN DIRECTED, TO FRONT POSITION

↓ YES

S05
REPLACE DISPLAY AREA AT FRONT POSITION WITH DISPLAY AREA TO WHICH LINE OF SIGHT HAS BEEN DIRECTED

| PREDETERMINED TRIGGER | GLANCE | GAZE FOR ONE SECOND | BLINK ONCE | BLINK TWICE |
|---|---|---|---|---|
| MOVE ONLY LINE OF SIGHT | DOES NOT CHANGE POSITIONS | CHANGE POSITIONS | DOES NOT CHANGE POSITIONS | CHANGE POSITIONS |
| MOVE FACE TOGETHER WITH LINE OF SIGHT | DOES NOT CHANGE POSITIONS | DOES NOT CHANGE POSITIONS | DOES NOT CHANGE POSITIONS | DOES NOT CHANGE POSITIONS |
| MOVE FACE AND BODY TOGETHER WITH LINE OF SIGHT | DOES NOT CHANGE POSITIONS | DOES NOT CHANGE POSITIONS | DOES NOT CHANGE POSITIONS | DOES NOT CHANGE POSITIONS |

LINE OF SIGHT

EYEWEAR DISPLAY DEVICE AND NON-TRANSITORY RECORDING MEDIUM

CROSS-REFERENCE TO RELATED APPLICATION

The disclosure of Japanese Patent Application No. 2022-142311 filed on Sep. 7, 2022, including description, claims, drawings, and abstract, is incorporated herein by reference in its entirety.

BACKGROUND

1. Technical Field

The present invention relates to an eyewear display device for displaying one or more display areas toward a region forward of the eyes of a user who wears the eyewear display device, and also relates to a non-transitory recording medium.

2. Description of Related Art

Conventionally, a worker who uses a plurality of displays for his/her work in an office or the like has looked at each display while changing his/her line of sight for each display. Some workers have directed their bodies, together with their lines of sight, to displays which the workers have looked at.

In recent years, eyewear display devices have been proposed. Such an eyewear display device is capable of displaying a three-dimensional keyboard and a plurality of displays, and is capable of causing a user to operate the keyboard and displays with the user wearing the eyewear display device. In addition, such an eyewear display device is capable of displaying a plurality of display areas in an augmented reality (AR) space at any position by any number in accordance with user's preference.

Japanese Unexamined Patent Application Publication No. 2008-65169 proposes, as an example of an eyewear display device, a display apparatus for realizing control for display operations by a user precisely reflecting the user's status, i.e., the user's intentions, visual state and physical conditions. The display apparatus enables the user to recognize visibly various images on a display unit positioned in front of the user's eyes thereby providing picked up images, reproduced images, and received images. As control for various display operations such as switching between the display state and the see-through state, display operation mode and selecting sources, the display apparatus acquires information on either behavior or physical status of the user. The display apparatus then determines either intention or status of the user in accordance with the acquired information, thereby controlling the display operation appropriately on the basis of the determination result.

According to a conventional eyewear display device such as the display apparatus described above, however, in a case where a plurality of display areas are displayed in an AR space, a user needs to direct his/her line of sight and body to each display area in order to look at the display area, as in a case where the user looks at a plurality of physical displays. The conventional eyewear display device consequently causes fatigue and is not easy to use.

SUMMARY

One or more embodiments of the present invention provide an eyewear display device capable of reducing the necessity for a user to change the direction of his/her line of sight and body in order to look at a plurality of display areas, and provide a non-transitory recording medium.

A first aspect of the present invention relates to an eyewear display device including:

a display that displays one or more display areas in front of eyes of a user wearing the eyewear display device;

a line-of-sight recognizer that recognizes a line of sight of the user; and a hardware processor that identifies one of the display areas to which the user is turning the eyes, based on a movement of the line of sight recognized by the line-of-sight recognizer, and changes a position of the identified display area.

A second aspect of the present invention relates to a non-transitory computer-readable recording medium storing instructions for a computer of an eyewear display device that comprises a display displaying one or more display areas in front of eyes of a user wearing the eyewear display device, the instructions causing the computer to execute:

recognizing a line of sight of the user;

identifying one of the display areas to which the user is turning the eyes, based on a movement of the line of sight recognized in the recognizing step; and changing a position of the identified display area.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 2 is a flowchart illustrating exemplary operations of the eyewear display device worn by a user;

FIG. 3 is an explanatory diagram of an exemplary change in position of a display area;

FIG. 4 is a table showing exemplary trigger conditions;

DETAILED DESCRIPTION OF EMBODIMENTS

Hereinafter, embodiments of the present invention will be described with reference to the drawings. However, the scope of the invention is not limited to the disclosed embodiments.

One or more embodiments of the present invention will be described below with reference to the drawings.

Figure 1:
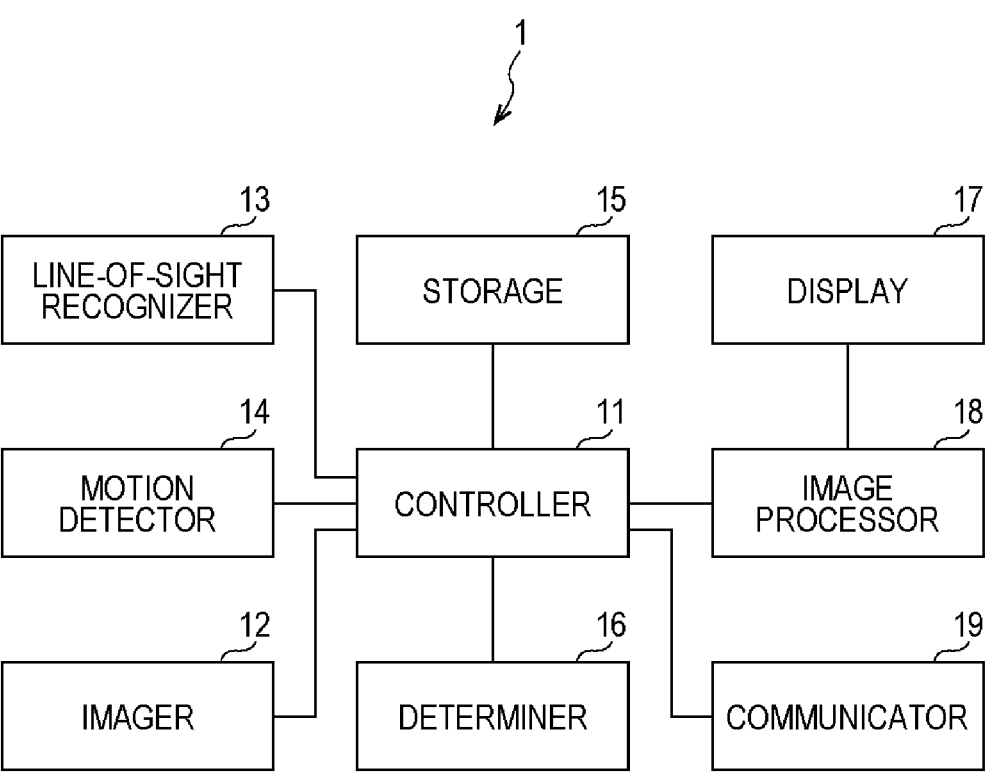
FIG. 1 is a block diagram illustrating a configuration of an eyewear display device according to one or more embodiments of the present invention.

FIG. 1 is a block diagram illustrating a configuration of an eyewear display device 1 according to one or more embodiments of the present invention.

The eyewear display device 1 includes a controller (i.e., a hardware processor or a computer) 11, an imager (or an imaging device) 12, a line-of-sight recognizer 13, a motion detector 14, a storage 15, a determiner 16, a display 17, an image processor 18, a communicator (or communication interface) 19, and the like. The eyewear display device 1 has the form of a pair of glasses wearable by a user.

The controller 11 controls the entire eyewear display device 1 in a centralized manner. The controller 11 includes a central processing unit (CPU) serving as a processor, a random access memory (RAM), a read only memory (ROM), and the like. The CPU operates in accordance with an operating program or instructions stored in the ROM or the like, thereby executing processing. The RAM is a memory that provides a workspace when the CPU operates in accordance with the operating program or instructions. The ROM is a memory that holds the operating program or instructions for the CPU, and other kinds of data. The operations of the controller 11 will be described in detail later.

The imager 12 is a camera that captures an image of a region forward of the eyewear display device 1 worn by the user, an image of the moving eyes of the user, and other images.

The line-of-sight recognizer 13 monitors the line of sight of the user wearing the eyewear display device 1, and recognizes the movement of the line of sight, the focus of the eyes, and the like, from the image of the moving eyes of the user captured by the imager 12, under the control of the controller 11. The line-of-sight recognizer 13 may also be configured as a part of the function of the controller 11.

The motion detector 14 includes a motion capture sensor, an acceleration sensor, a gyro sensor, and the like. The motion detector 14 detects and acquires information on a user's motion or physical state, such as a change in direction of the user's face or body.

The storage 15 stores various kinds of data. Examples of the data to be stored include a front position (in the form of coordinates), a position or positions (in the form of coordinates) of one or more display areas to be displayed in a three-dimensional space by the display 17, a trigger condition (to be described later) for changing the position of each display area, an image captured by the imager 12, and application software. The front position may be optionally changeable. The controller 11 may previously or timely set and/or change the front position, for example, based on instructions received via a network, or based on a setting operation by the user via a user interface of the eyewear display device 1. The controller 11 may also change the position of the identified display area upward, downward, leftward, rightward, frontward, or rearward. Further, the controller 11 may also previously or timely set the trigger condition or a combination of trigger conditions, for example, based on instructions received via the network, or based on the setting operation by the user via the user interface.

The determiner 16 makes a determination whether a trigger condition for moving a specific one of the display areas displayed by the display 17 is satisfied. The determiner 16 also makes a determination as to a position of each display area relative to the eyewear display device 1 in the three-dimensional space, and other determinations. The determiner 16 may be configured as a part of the function of the controller 11.

The display 17 displays the one or more display areas toward a region forward of the user wearing the eyewear display device 1.

The image processor 18 subjects an image to image processing before the image is displayed in one of the display areas by the display 17. The image processor 18 may comprise a CPU or may be configured as a part of the function of the controller 11.

The communicator 19 establishes data communications with an external device via a network or by near field communication.

With reference to a flowchart of FIG. 2, the following describes exemplary operations of the eyewear display device 1 worn by the user. These operations and operations to be described later are performed in such a manner that the CPU of the eyewear display device 1 operates in accordance with the operating program or instructions stored in the ROM or the like.

In one or more embodiments, a display area at a position different from the front position is moved to the front position in accordance with the movement of the user's line of sight.

In step S01, the controller 11 determines whether the user's line of sight has been moved to a display area located at a position different from the front position, based on a result of line-of-sight recognition by the line-of-sight recognizer 13. When the user's line of sight has not been moved (NO in step S01), the processing proceeds to step S02. In step S02, the controller 11 performs none of the operations. In other words, the controller 11 does not change (refrains from changing) the positions of the display areas.

When the user's line of sight has been moved (YES in step S01), the processing proceeds to step S03. In step S03, the controller 11 determines whether there is a display area at the front position. When there is no image area at the front position (NO in step S03), the processing proceeds to step S04. In step S04, the controller 11 identifies the display area to which the user has directed his/her line of sight, that is, a display area which the user intends to look at, (i.e., a display area to which the user is turning the eyes) and moves the identified display area to the front position. When there is a display area at the front position (YES in step S03), the processing proceeds to step S05. In step S05, the controller 11 replaces the display area at the front position with the display area to which the user has directed his/her line of sight.

It is assumed that, as illustrated in, for example, FIG. 3, a display area 21 is displayed at the front position, and four display areas 22 to 25 are respectively displayed on the four corners of the display area 21. When a user 100 wearing the eyewear display device 1 directs his/her line of sight from the display area 21 at the front position to the display area 22 on the upper left corner of the display area 21, the controller 11 identifies the display area 22 as a display area which the user 100 intends to look at, and replaces the display area 21 with the display area 22 as indicated by an arrow A1.

As described above, the display area 22 to which the user 100 wearing the eyewear display device 1 has directed his/her line of sight is considered as the display area which the user 100 intends to look at. Therefore, the display area 21 at the front position is replaced with the display area 22, so that the display area which the user 100 intends to look at is always displayed at the front position. Therefore, the user 100 does not need to direct his/her line of sight and body to each display area in order to look at the plurality of display areas, so that the user 100 is able to stably use the eyewear display device 1 without fatigue.

In the foregoing operation example, the position of the display area 22 to which the user 100 has directed his/her line of sight is changed to the front position. According to the configuration of changing a display area with only a movement of a line of sight as a trigger, however, the position of the display area is occasionally changed against the intention of the user 100.

In view of this, other conditions, in addition to the movement of the line of sight, may be additionally set as trigger conditions for changing the positions of the display areas. FIG. 4 is a table showing exemplary trigger conditions. In the example shown in this table, a display area is moved to the front position when the user 100 directs his/her line of sight to the display area and then gazes at the display area for one second or when the user 100 directs his/her line of sight to the display area and then blinks twice. When the controller 11 determines that the user 100 has moved his/her face together with his/her line of sight or when the controller 11 determines that the user 100 has directed his/her face or body together with his/her line of sight to the display area, then the controller 11 determines that the user 100 intends to look at both the display area at the front position and the display area to which the user 100 has directed his/her line of sight. In this case, accordingly, the controller 11 refrains from changing the positions of the display areas. It should be noted that the trigger conditions may be set for each user 100.

As described above, additionally setting the other conditions in addition to the movement of the line of sight enables prevention of occurrence of a situation in which the positions of the display areas are changed against the intention of the user 100.

Figure 5:
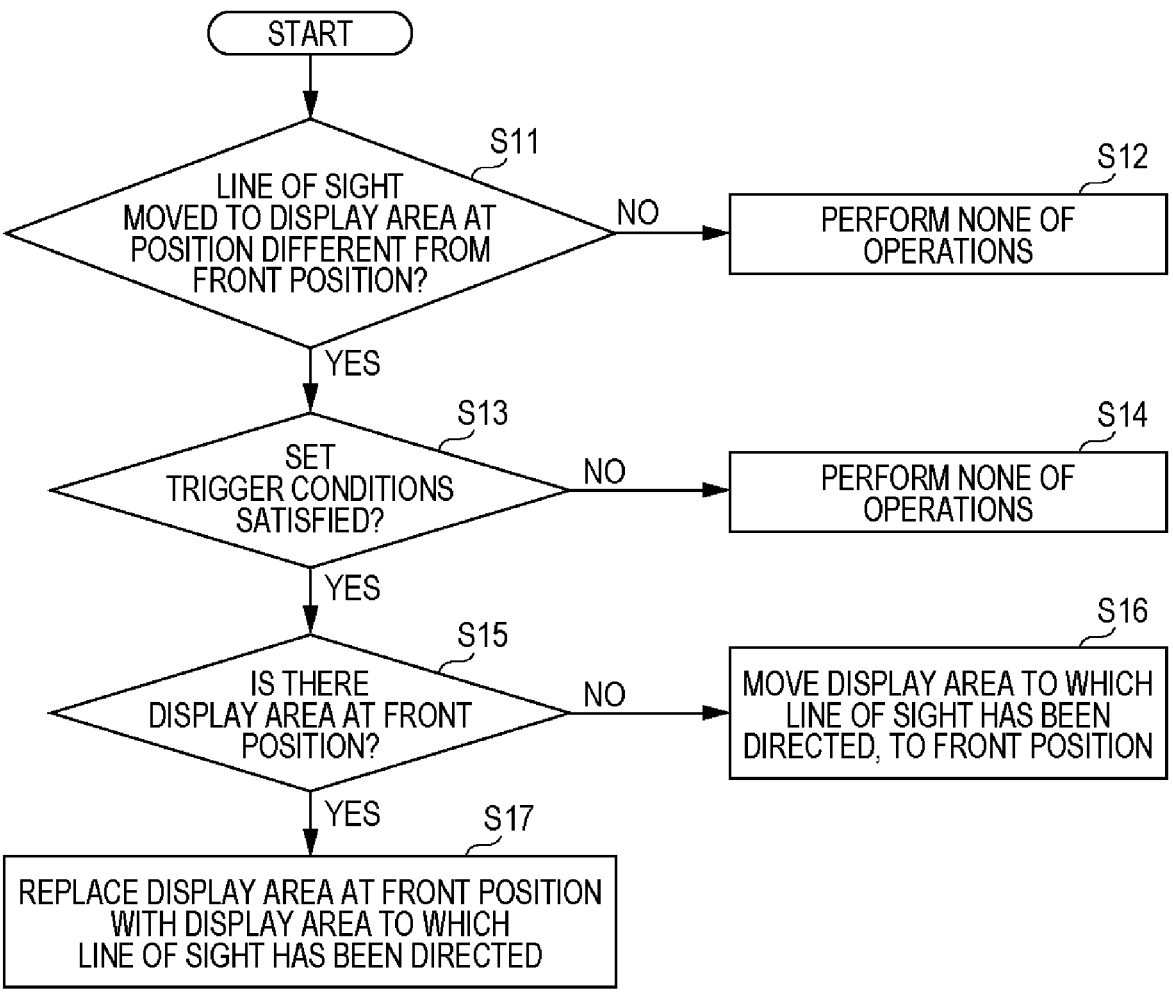
FIG. 5 is a flowchart illustrating operations of the eyewear display device for which the trigger conditions are set.

FIG. 5 is a flowchart illustrating operations of the eyewear display device 1 for which the foregoing trigger conditions are set.

In step S11, the controller 11 determines whether the user's line of sight has been moved to a display area different from the display area at the front position, based on a result of line-of-sight recognition by the line-of-sight recognizer 13. When the user's line of sight has not been moved (NO in step S11), the processing proceeds to step S12. In step S12, the controller 11 performs none of the operations. In other words, the controller 11 refrains from changing the positions of the display areas.

When the user's line of sight has been moved (YES in step S11), the processing proceeds to step S13. In step S13, the controller 11 determines whether the set trigger conditions are satisfied. When the trigger conditions are not satisfied (NO in step S13), the processing proceeds to step S14. In step S14, the controller 11 performs none of the operations (i.e., the controller 11 refrains from changing the positions of the display areas).

When the trigger conditions are satisfied (YES in step S13), the processing proceeds to step S15. In step S15, the controller 11 determines whether there is a display area at the front position. When there is no display area at the front position (NO in step S15), the processing proceeds to step S16. In step S16, the controller 11 identifies the display area to which the user has directed his/her line of sight, and moves the identified display area to the front position. When there is a display area at the front position (YES in step S15), the processing proceeds to step S17. In step S17, the controller 11 replaces the display area at the front position with the display area to which the user has directed his/her line of sight.

In one or more embodiments, the "front position" in the case where the position of the display area to which the user 100 has directed his/her line of sight (e.g., the display area 22 in FIG. 3) is changed to the front position or in the case where the display area at the front position (e.g., the display area 21 in FIG. 3) is replaced with the display area to which the user 100 has directed his/her line of sight refers to at least one of the following positions. That is, the "front position" may be a front position at the center of the eyewear display device 1, the front position being changeable in accordance with the direction of the eyewear display device 1, or a position indicated by coordinates (a direction) set by the user 100 in advance.

Figure 6:
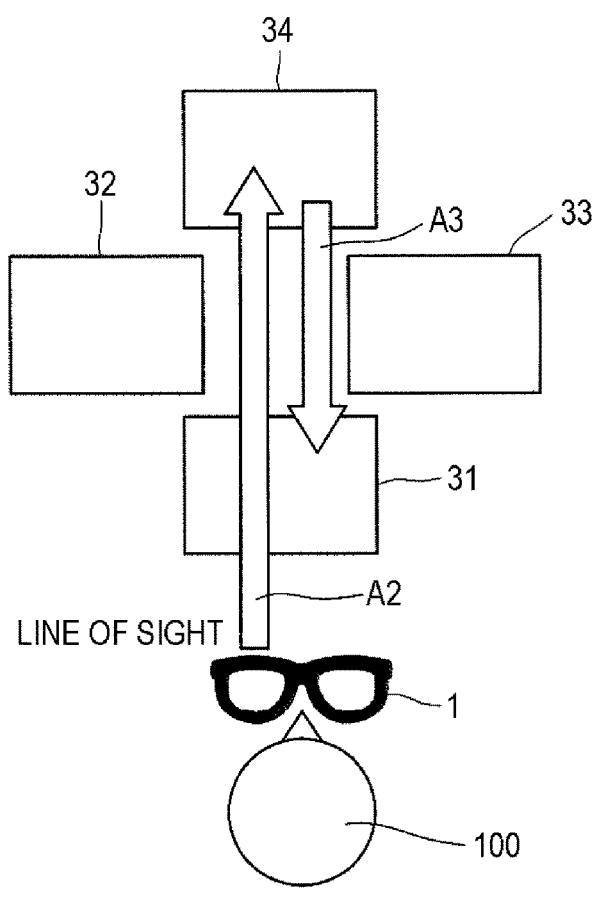
FIG. 6 is an explanatory diagram of another exemplary change in position of a display area.

The display areas may alternatively be fixed at positions in a three-dimensional space. As illustrated in, for example, a schematic plan view of FIG. 6, with respect to a display area 31 displayed at a front position, a display area 34 is displayed behind the display area 31 with a spacing between the display area 34 and the display area 31. In addition, display areas 32 and 33 are displayed between the front display area 31 and the rear display area 34. The display area 32 is located on the left side of each of the display areas 31 and 34. The display area 33 is located on the right side of each of the display areas 31 and 34.

In a case where the user 100 directs his/her line of sight from the front display area 31 at the front position to the rear display area 34 at the front position as indicated by an arrow A2, the controller 11 may replace the front display area 31 with the rear display area 34 as indicated by an arrow A3. In this case, the controller 11 may detect that the eyes of the user 100 are focused on the rear display area 34, and identify the rear display area 34 as a display area which the user 100 intends to look at. In a case where there are a plurality of display areas, in addition to the front and rear display areas 31 and 34, on the line of sight, the controller 11 is not easy to identify a display area which the user 100 intends to look at, only from the movement of his/her line of sight. Therefore, the controller 11 may identify a display area on which the eyes of the user 100 are focused.

In a case where the user 100 fixedly sets the positions (coordinates) of the display areas in the three-dimensional space, the controller 11 may identify a display area to which the user 100 has directed his/her line of sight, as follows.

That is, the set positions of the display areas in the three-dimensional space are stored in the storage 15. The controller 11 determines a position of each display area relative to the eyewear display device 1 in the three-dimensional space. The controller 11 then identifies a display area which the user 100 intends to look at, from each determined relative position and the movement of the user's line of sight recognized by the line-of-sight recognizer 13. The controller 11 thus changes the position of the identified display area to the front position. The controller 11 is therefore capable of easily identifying the display region, to which the user has directed his/her line of sight, in the three-dimensional space even when the direction of the eyewear display device 1 is changed. In one or more embodiments, the controller 11 changes the position of the identified display area to the front position, by directly replacing a front display area among the display areas with the identified display area, or by sliding at least two of the display areas including the front display area.

The display areas may include, in addition to the display areas that are located within the field of view of the user 100, display areas that are placed in the three-dimensional space, are not associated with the movement of the eyewear display device 1, and are located outside the field of view of the user 100. The controller 11 is capable of identifying a display area which is located outside the field of view and to which the user has directed his/her line of sight, and is therefore capable of moving this identified display area to the front position.

Figure 7:
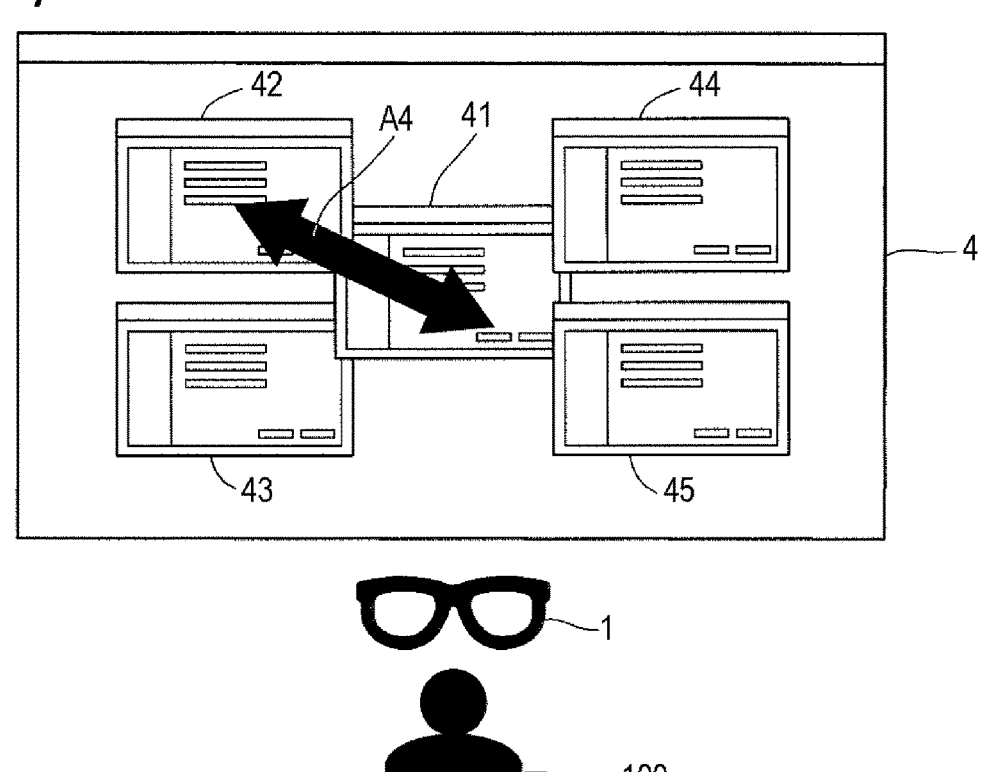
FIG. 7 is an explanatory diagram of still another exemplary change in position of a display area.

FIG. 7 illustrates another exemplary display areas. Display areas may be located independently of each other like the display areas 21 to 25 illustrated in FIG. 3 and the display areas 31 to 34 illustrated in FIG. 6. As illustrated in FIG. 7, alternatively, window areas 41 to 45 displayed in a single screen 4 may be regarded as display areas. In the example illustrated in FIG. 7, the window area 41 is located at the front position, and the window areas 42 to 45 are respectively located on the four corners of the window area 41. Also in this case, when the user 100 directs his/her line of sight from the window area 41 to the window area 42, the controller 11 may identify the window area 42 as a display area which the user 100 intends to look at, from the movement of his/her line of sight, and may replace the window area 41 at the front position with the window area 42 as indicated by an arrow A4. The single screen 4 may have a flat surface or a curved surface.

Alternatively, the window areas 41 to 45 in the single screen 4 may be displayed concurrently with one or more window areas in another single screen. Still alternatively, one or more window areas in the single screen 4 or multiple screens may be displayed concurrently with an independent display area outside the screen(s). In addition, an independent display area may be set at a position outside the user's field of view.

Figure 8A:
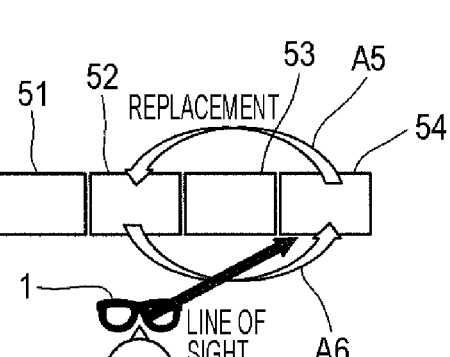
FIGS. 8A and 8B are diagrams illustrating how to replace a display area at a front position with a display area to which the user has directed his/her line of sight.
Figure 8B:
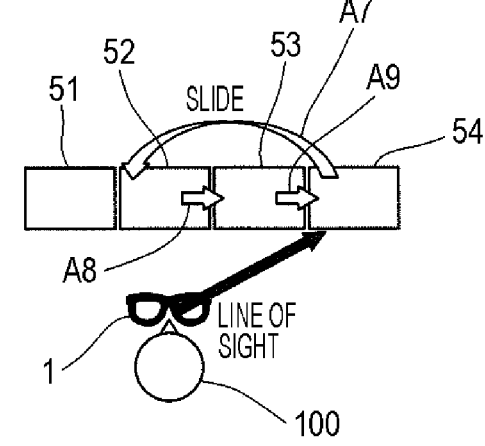

FIGS. 8A and 8B are diagrams each illustrating how to change the position of the display area to which the user has directed his/her line of sight, to the front position. As illustrated in FIGS. 8A and 8B, four display areas 51 to 54 are arranged side by side. It is assumed herein that the display area 52 is located at the front position, and the user 100 wearing the eyewear display device 1 directs his/her line of sight to the display area 54.

In FIG. 8A, the display area 52 at the front position is directly replaced with the display area 54 to which the user has directed his/her line of sight, as indicated by arrows A5 and A6. In FIG. 8B, the display area 54 to which the user has directed his/her line of sight is moved to the front position at which the display area 52 has been originally displayed, as indicated by an arrow A7. The display area 52 is moved to the original position of the display area 53 so as to slide rightward as indicated by an arrow A8 while the display area 53 is moved to the original position of the display area 54 so as to slide rightward as indicated by an arrow A9.

Figure 9A:
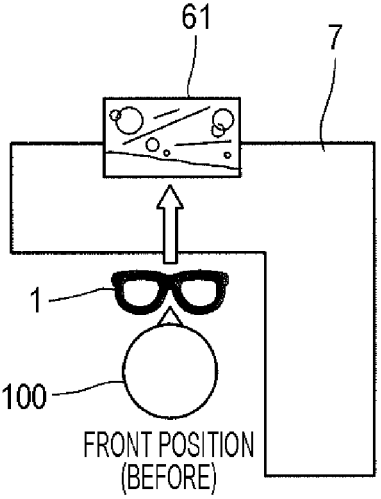
FIGS. 9A and 9B are diagrams illustrating how to change a front position in a case where the direction of the user is changed by 90 degrees.
Figure 9B:
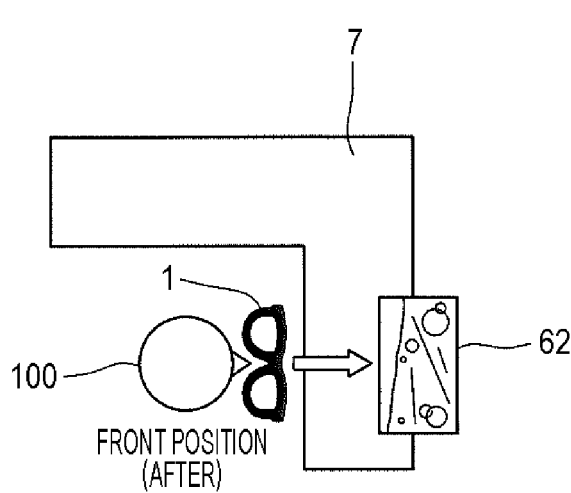

In the foregoing embodiments, the display area to which the user has directed his/her line of sight is moved to the front position. Alternatively, when the user 100 who looks forward at an "L"-shaped desk 7 as illustrated in FIG. 9A changes his/her direction by 90 degrees as illustrated in FIG. 9B, the controller 11 changes the front position in accordance with the direction of the user 100. The controller 11 displays a display area 61 which has been displayed at the original front position, as a display area 62 moved to the front position after the change in direction of the user 100 by 90 degrees. In a case where the user 100 sets the front position in the three-dimensional space, when the user 100 changes his/her direction, the controller 11 determines a position of the set front position relative to the eyewear display device 1. The controller 11 then moves the front position set to be the same as the relative position after the change in direction of the user 100.

The display region to which the user has directed his/her line of sight may be moved to a preset position different from the front position, rather than the front position.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An eyewear display device comprising:
an imaging device that captures an image of a user wearing the eyewear display device; and
a hardware processor that:
displays, in a field of view of the user, a plurality of display areas each capable of displaying different images;
recognizes a line of sight of the user based on the image;
identifies one of the display areas to which the user is turning the eyes, based on a direction of the line of sight that has been recognized; and
moves an image displayed in the identified display area to a predetermined position within the field of view of the user.

2. The eyewear display device according to claim 1, wherein
the one of the display areas to which the user is turning the eyes includes at least one of:
a display area that is within the field of view of the user; and
a display area that is in a three-dimensional space and outside the field of view, and is not associated with a movement of the eyewear display device.

3. The eyewear display device according to claim 1, wherein
the hardware processor moves the image displayed in the identified display area to a front position.

4. The eyewear display device according to claim 3, wherein
the front position includes at least one of:
a front position relative to the eyewear display device worn by the user, and
a preset front position.

5. The eyewear display device according to claim 3, further comprising:
a storage that stores positions of the display areas in a three-dimensional space, the positions being set by the user, wherein
the hardware processor further:
determines a position of each of the display areas relative to the eyewear display device in the three-dimensional space,
identifies the one of the display areas to which the user is turning the eyes, based on a determination result of the position of the identified display area and the direction of the line of sight that has been recognized, and
moves the image displayed in the identified display area to the front position.

6. The eyewear display device according to claim 1, wherein
the hardware processor moves the image displayed in the identified display area, based on trigger conditions set in accordance with the user, in addition to the line of sight that has been recognized.

7. The eyewear display device according to claim 1, further comprising:

a motion detector that acquires information on a motion or a physical state of the user, wherein based on the information acquired by the motion detector, upon determining that the user has moved a face together with the line of sight, or upon determining that the user has directed the face or a body together with the line of sight to the identified display area, the hardware processor refrains from moving the image displayed in the identified display area.

8. The eyewear display device according to claim 6, wherein the hardware processor sets a combination of the trigger conditions, based on a setting operation by the user.

9. The eyewear display device according to claim 1, wherein in a case that there are a plurality of display areas on the line of sight, the hardware processor identifies, as the one of the display areas to which the user is turning the eyes, a display area on which the eyes are focused.

10. The eyewear display device according to claim 1, wherein the hardware processor moves the image displayed in the identified display area upward, downward, leftward, rightward, frontward, or rearward.

11. The eyewear display device according to claim 1, wherein one or more of the display areas include a plurality of window areas displayed in a single screen.

12. The eyewear display device according to claim 3, wherein the hardware processor moves the image displayed in the identified display area to the front position, by directly replacing a front display area among the display areas with the identified display area, or by sliding at least two of the display areas including the front display area.

13. The eyewear display device according to claim 3, wherein the front position is optionally changeable.

14. The eyewear display device according to claim 13, wherein when changing the front position, the hardware processor displays one of the display areas at the front position before being changed, at the front position having been changed.

15. A non-transitory computer-readable recording medium storing instructions for a computer of an eyewear display device that comprises an imaging device, the instructions causing the computer to execute:

capturing, by the imaging device, an image of a user wearing the eyewear display device;

displays, in a field of view of the user, a plurality of display areas each capable of displaying different images;

recognizing a line of sight of the user based on the image;

identifying one of the display areas to which the user is turning the eyes, based on a direction of the line of sight that has been recognized; and moving an image displayed in the identified display area to a predetermined position within the field of view of the user.

* * * * *